US006536261B1

(12) United States Patent
Weldon et al.

(10) Patent No.: US 6,536,261 B1

(45) Date of Patent: Mar. 25, 2003

(54) VACUUM LEAK VERIFICATION SYSTEM AND METHOD

(75) Inventors: Craig Andrew Weldon; Kwang Yew, both of Chatham (CA)

(73) Assignee: Siemens Automotive Inc., Chatham (CA)

( * ) Notice: Subject to any disclaimer, the term of this patent is extended or adjusted under 35 U.S.C. 154(b) by 174 days.

(21) Appl. No.: 09/843,175

(22) Filed: Sep. 8, 2000

Related U.S. Application Data

(60) Provisional application No. 60/153,014, filed on Sep. 9, 1999, and provisional application No. 60/153,016, filed on Sep. 9, 1999.

(51) Int. Cl.[7] .......................... G01M 3/04

(52) U.S. Cl. .................. 73/49.7; 73/118.1; 123/520

(58) Field of Search ..................... 73/40, 40.5 R, 73/49.7, 118.1; 123/520; 702/51

(56) References Cited

U.S. PATENT DOCUMENTS

| | | | | | |
|---|---|---|---|---|---|
| 4,984,448 | A | * | 1/1991 | Jordan et al. | 73/40.5 R |
| 5,261,379 | A | * | 11/1993 | Lipinski et al. | 123/520 |
| 5,429,099 | A | * | 7/1995 | DeLand | 123/520 |
| 5,817,925 | A | * | 10/1998 | Cook et al. | 73/40 |
| 5,975,062 | A | * | 11/1999 | Bonse et al. | 123/519 |
| 6,283,098 | B1 | * | 9/2001 | Corkill | 123/520 |
| 6,301,955 | B1 | * | 10/2001 | Cook et al. | 73/49.7 |
| 6,327,901 | B1 | * | 12/2001 | Dawson et al. | 73/118.1 |
| 6,363,921 | B1 | * | 4/2002 | Cook et al. | 123/520 |

* cited by examiner

*Primary Examiner*—Hezron Williams
*Assistant Examiner*—Charles D. Garber

(57) ABSTRACT

A system and method for performing a leak verification test to test the evaporative emission space for leakage comprising self-calibrating the purge valve, closing the evaporative emission space to atmosphere and an intake system of the engine and monitoring for conditions calling for aborting the test, performing a leak determination test, and entering a sleep mode while the engine continues to run.

10 Claims, 11 Drawing Sheets

VACUUM LEAK DETECTION SYSTEM
METERED PURGE (0.3 Hz 20 mSEC. PULSE)
60 L. VOLUME, 14.0 vDC

| OPERATING STATE | SOLENOID ENERGIZATION | VALVE 136 | VALVE 134 | VENT VALVE 132 |
|---|---|---|---|---|
| 1ST | 0% | CLOSED | OPEN | OPEN |
| 2ND | 50% | CLOSED | OPEN | CLOSED |
| 3RD | 100% | OPEN | CLOSED | OPEN |

FIG. 11
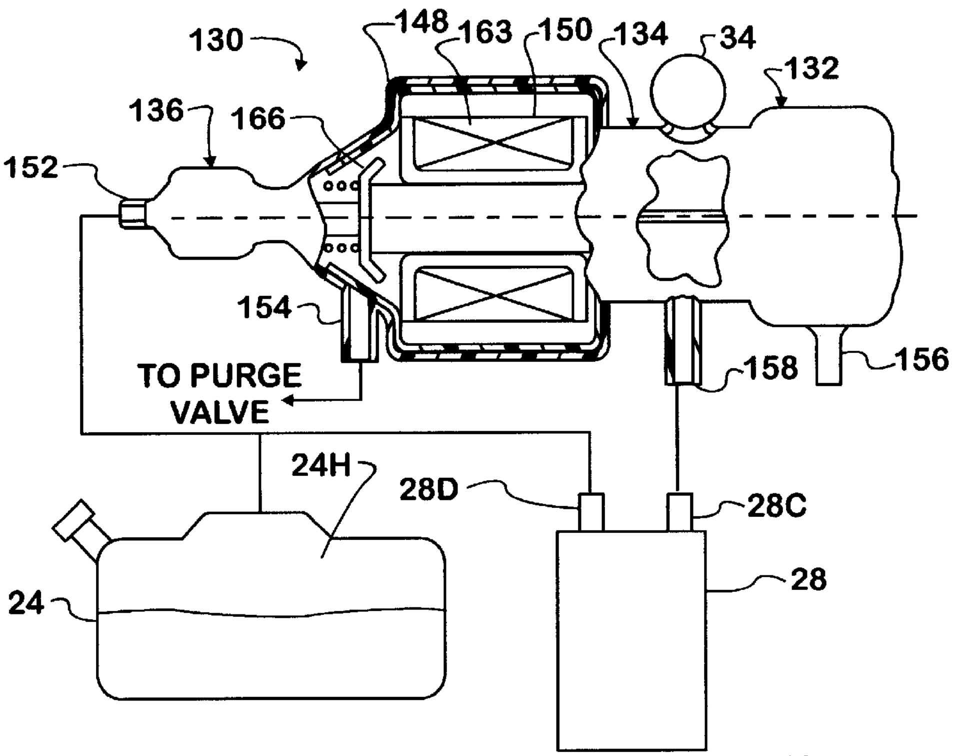
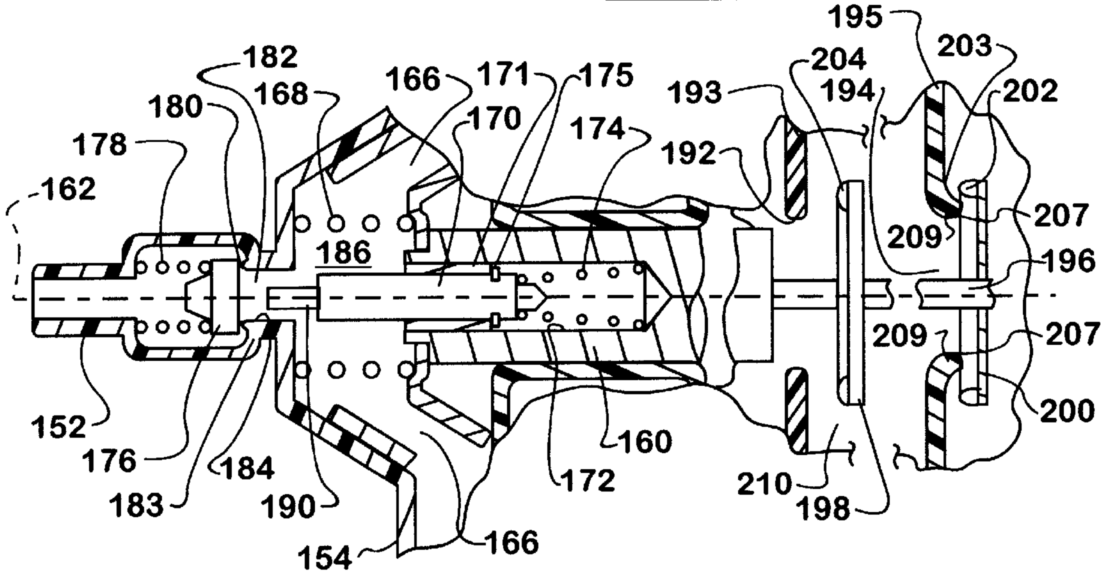
FIG. 12

VACUUM LEAK VERIFICATION SYSTEM AND METHOD

REFERENCE TO RELATED APPLICATIONS AND PRIORITY CLAIM

This application derives from the following commonly owned co-pending patent applications, the priority benefits of which are expressly claimed: Provisional Application Ser. No. 60/153,014 filed on or about Sep. 9, 1999 in the names of Cook et al.; and Provisional Application Ser. No. 60/153,016 filed on or about Sep. 9, 1999 in the names of Weldon et al.

FIELD OF THE INVENTION

This invention relates generally to on-board systems and methods for detecting fuel vapor leakage from an evaporative emission space of an automotive vehicle fuel system, relating particularly to a leak verification system characterized by various novel aspects one of which comprises selectively communicating evaporative emission space cooperatively defined by a fuel tank and a vapor storage canister through a purge valve to an intake system of an engine in different ways provide various novel test capabilities.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to the intake system of the engine. The fuel tank headspace and the vapor collection canister define most of the volume of an evaporative emission space where fuel vapors are contained so they do not escape to atmosphere. Known purge valves are sometimes referred to by various names that include canister purge solenoid (CPS) valves and proportional purge solenoid (PPS) valves. Certain purge valves are electrically controlled. Such a purge valve may comprise a solenoid actuator that is under the control of a microprocessor-based engine management system, sometimes referred to by various names, such as an engine management computer or an engine electronic control unit, to control the opening and closing of the purge valve and hence control flow from the evaporative emission space to the engine intake system.

During conditions conducive to purging, the evaporative emission space is purged to the engine intake system through the purge valve. The space is vented to atmosphere by opening the vent valve, and the purge valve is opened by a signal from the engine management computer in an amount that allows vacuum developed in the engine intake system by operation of the engine to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of tailpipe emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space that is substantially different from the ambient atmospheric pressure, and then watching for a change in that substantially different pressure which is indicative of a leak.

It is believed fair to say that there are two basic types of diagnostic systems and methods for determining integrity of an evaporative emission space against leakage.

Commonly owned U.S. Pat. No. 5,146,902 "Positive Pressure Canister Purge System Integrity Confirmation" discloses one type: namely, a system and method for making a leakage determination by pressurizing the evaporative emission space to a certain positive pressure therein (the word "positive" meaning relative to ambient atmospheric pressure) and then watching for a drop in positive pressure indicative of a leak. Other positive pressure type systems are disclosed in other commonly owned patents, including U.S. Pat. Nos. 5,383,437; and 5,474,050.

The other of the two general types of systems for making a leakage determination does so by creating in the evaporative emission space a certain negative pressure (the word "negative" meaning relative to ambient atmospheric pressure so as to denote vacuum) and then watching for a loss of vacuum indicative of a leak. A known procedure employed by this latter type of system in connection with a leak test comprises utilizing engine manifold vacuum to create vacuum in the evaporative emission space. Because that space may, at certain non-test times, be vented through the canister to allow vapors to be efficiently purged when the purge valve is opened for purging fuel vapors from the tank headspace and canister, it is known to communicate the canister vent port to atmosphere through the open vent valve when vapors are being purged to the engine. The vent valve however closes preparatory to a leak test so that a desired test vacuum can be drawn in the evaporative emission space for the test. Once a desired vacuum has been drawn, the purge valve is closed, and leakage appears as a loss of vacuum during the length of the test time after the purge valve has been operated closed.

In order for an engine management computer to ascertain when a desired vacuum has been drawn so that it can command the purge valve to close, and for loss of vacuum to thereafter be detected, it is known to employ an electric sensor, or transducer, that measures negative pressure, i.e. vacuum, in the evaporative emission space by supplying a measurement signal to the engine management computer. It is known to mount a pressure sensor in various ways. One way is on the vehicle fuel tank where the sensor is exposed to the tank headspace, as in commonly owned U.S. Pat. No. 5,267,470 disclosing a pressure sensor mounting in conjunction with a fuel tank roll-over valve. Another way is described in commonly owned U.S. Pat. No. 6,050,245 disclosing a pressure sensor mounting in a vent valve. Other commonly owned patents such as U.S. Pat. Nos. 5,957,115; 5,967,124; 6,009,746; 6,016,690; 6,016,691; 6,016,793; and 6,044,314 disclose various leak detection systems some of which include modules containing both a pressure sensor and a vent valve.

SUMMARY OF THE INVENTION

One generic aspect of the present invention relates to an automotive vehicle that is powered by an internal combustion engine and comprises a tank for storing volatile fuel that is consumed by the engine and a vapor storage canister that comprises a dirty air port in communication with headspace of the tank to cooperatively define an evaporative emission space for containing vapor generated by the evaporation of liquid fuel in the tank and that comprises a vapor absorbent medium separating the dirty air port from a clean air port. A system performs a leak verification test to test the evaporative emission space for leakage comprising self-calibrating the purge valve, closing the evaporative emission space to atmosphere and an intake system of the engine and monitoring for conditions calling for aborting the test, performing a leak determination test, and entering a sleep mode while the engine continues to run.

Another generic aspect of the present invention relates to the method performed by the above-described system.

The foregoing, and other features and aspects, along with various advantages and benefits of the invention, will be seen in the ensuing description and claims, which are accompanied by drawings. The drawings, which are incorporated herein and constitute part of this specification, disclose a preferred embodiment of the invention according to the best mode contemplated at this time for carrying out the invention.

BRIEF DESCRIPTION OF THE DRAWINGS

FIG. 11 is a longitudinal cross section view through an assembly used in the second embodiment of FIG. 9.

FIG. 12 is an enlarged cross section view of a portion of FIG. 11.

DESCRIPTION OF THE PREFERRED EMBODIMENT

Figure 1:
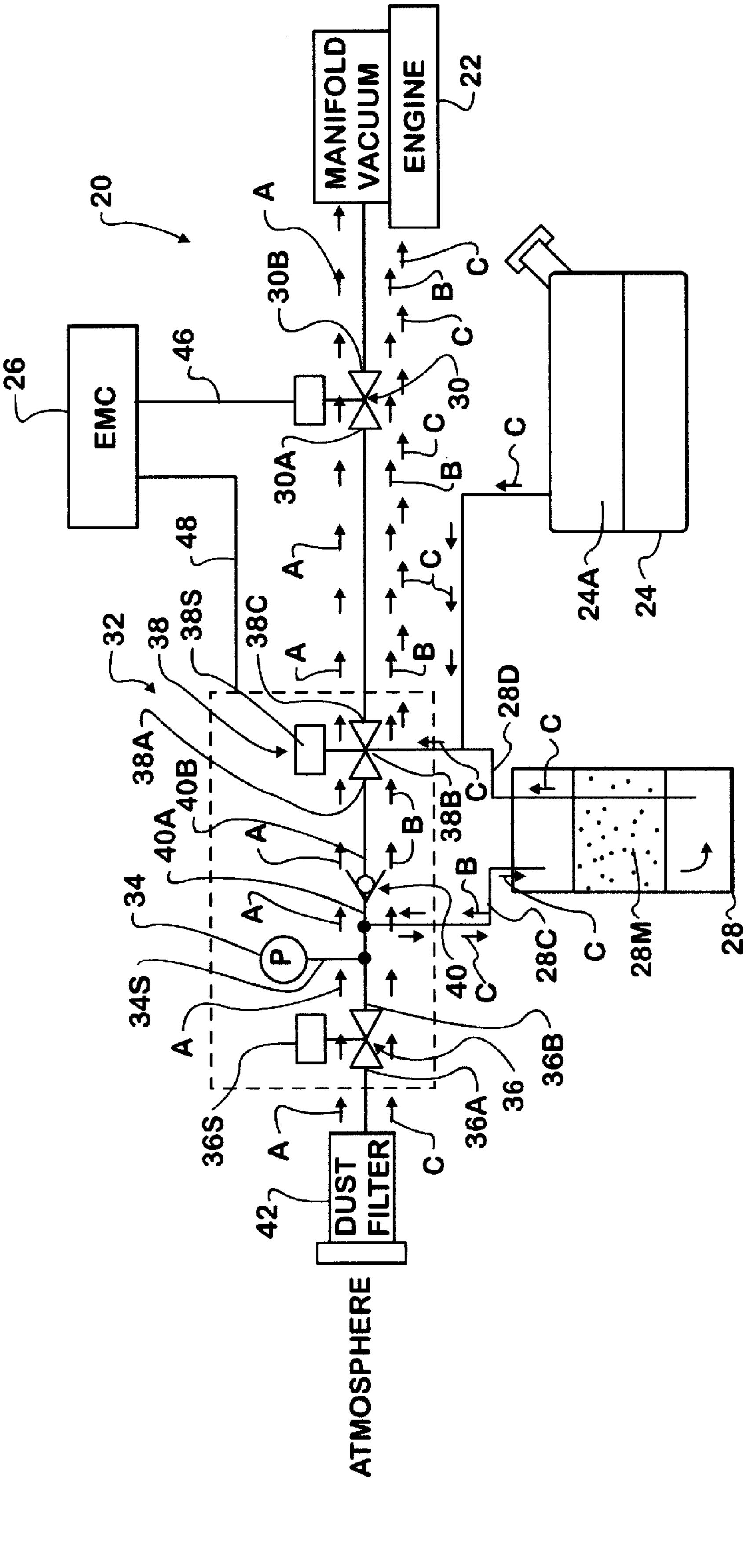
FIG. 1 is a general schematic diagram of an automotive vehicle evaporative emission control system including a first exemplary embodiment of vacuum leak verification system embodying principles of the invention.

FIG. 1 shows an exemplary automotive vehicle evaporative emission control (EEC) system 20 in association with an internal combustion engine 22 that powers the vehicle, a fuel tank 24 that holds a supply of volatile liquid fuel for the engine, and an engine management computer (EMC) 26 that exercises certain controls over operation of engine 22. EEC system 20 comprises a vapor collection canister (charcoal canister) 28 and a solenoid operated purge valve 30. Several additional devices are associated with EEC system 20 to form a vacuum leak verification system (vacuum LVS) 32. In the illustrated embodiment, these additional devices are shown collectively in a module mounted atop canister 28.

The interior of canister 28 comprises a clean air space and a dirty air space that are separated by a medium 28M that allows air to pass substantially freely between the two spaces but absorbs fuel vapors entrained in that air so that through-passage of such vapors from one space to the other is prevented. Canister 28 comprises a dirty air port 28D that is in communication with the dirty air space and a clean air port 28C that is in communication with the clean air space. The additional devices forming LVS 32 include a pressure sensor 34, a vent valve 36, a diverter valve 38, and a check valve 40.

Vent valve 36 comprises two ports. One port 36A is communicated through a dust filter 42 to atmosphere, and the other 36B is in common communication with clean air port 28C, a sensing port 34S of pressure sensor 34, and an inlet port 40A of check valve 40.

Diverter valve 38 comprises three ports. A first port 38A is communicated to an outlet port 40B of check valve 40, a second 38B is communicated to dirty air port 28C, and a third 38C is communicated to an inlet port 30A of purge valve 30 which also comprises an outlet port 30B that is communicated to the intake system of engine 22.

Headspace 24H of fuel tank 24 is in common communication with dirty air port 28D and port 38B of diverter valve 38.

EMC 26 is electrically connected to the solenoid of purge valve 30 and to respective actuators 36S and 38S of vent valve 36 and diverter valve 38 respectively. When neither actuator 36S nor actuator 38S is not being actuated by EMC 26, vent valve 36 is open and diverter valve 38 provides open communication between its second port 38B and its third port 38C while closing its first port 38A. This serves to vent canister 28 and tank headspace 24H to atmosphere. With the evaporative emission space being vented to atmosphere, actuation of purge valve 30 by EMC 26 is effective to open a purge flow path through purge valve 30 to the engine intake system where the presence of engine vacuum will induce purge flow through the open purge path marked by the reference letter C. This is the mode of operation during times when no leak verification test is being performed.

A portion of a leak verification test comprises EMC 26 actuating both actuators 36S and 38S. This causes vent valve 36 to close, and diverter valve 38 to establish open communication between its first port 38A and its third port 38C while closing its second port 38B. When EMC 26 thereafter opens purge valve 30, the intake system of engine 22 is able to draw vacuum in the evaporative emission space through a flow path comprising purge valve 30, diverter valve 38, and check valve 40. This flow path is marked by the reference letter B. Because flow from the evaporative emission space to the engine intake system is from the clean air side of canister 28, only air that is free of entrained fuel vapor is drawn through flow path B. This provides the test with an ability to check the integrity of medium 28M in separating the clean air space from the dirty air space, as will be more fully explained in subsequent description.

Preparatory to leak determination, the flow path through purge valve 30 to the engine intake system is preconditioned. To enable this preconditioning, actuator 38S is actuated while actuator 36S is not. Engine intake system vacuum now draws air through filter 42, vent valve 36, check valve 40, diverter valve 38, and purge valve 30. To the extent that this might draw from the evaporative emission space, any draw would be from the clean air side of canister 28 and hence free of fuel vapor. By allowing this drawing of air that is free of fuel vapor to continue for an appropriate amount of time, the flow through the flow path, which incidentally is marked by the reference letter A, rids the flow path of any residual fuel vapor thereby preconditioning it for subsequent testing that will be more fully explained hereinafter.

Check valve 40 serves a redundancy function by blocking potential backflow should valve 38 fail to fully block port 38A when operated to block that port.

EMC 26 receives a number of inputs (engine-related parameters for example) relevant to control of certain operations of engine 22 and its associated systems, including EEC system 20. One electrical output port of EMC 26 controls purge valve 30 via an electrical connection 46; other ports of EMC 26 are coupled with pressure sensor 34 and with actuators 36S, 38S via electrical connections, depicted generally by the reference numeral 48.

At certain times, EMC 26 commands a leak verification test for ascertaining the integrity of EEC system 20, particularly the evaporative emission space that contains volatile fuel vapors, against leakage. Detail of leak verification testing will be disclosed in subsequent description of FIGS. 2A–6. At times of operation of the vehicle other than during such test times, EMC 26 operates purge valve 30 to purge vapors from the evaporative emission space, including those collected in medium 28M of canister 28, in a scheduled manner, but without creating vacuum magnitudes in the evaporative emission space that are comparable to those drawn during a leak verification test.

During such non-test times, EMC 26 selectively operates purge valve 30 such that the valve opens under conditions conducive to purging and closes under conditions not conducive to purging. During those times relatively unrestricted venting of the evaporative emission space to atmosphere prevails because vent valve 36 is open. Thus, during times of operation of the vehicle, the purge function is performed in a manner specified by the manufacturer of the particular vehicle and engine so long as a leak verification test is not being performed.

FIGS. 2A–6 disclose detail of a leak verification test according to principles of the present invention. Each of these Figures comprises a flow diagram representing a respective phase. EMC 26 comprises a processor that executes algorithms according to the flow diagrams.

Figure 2A:
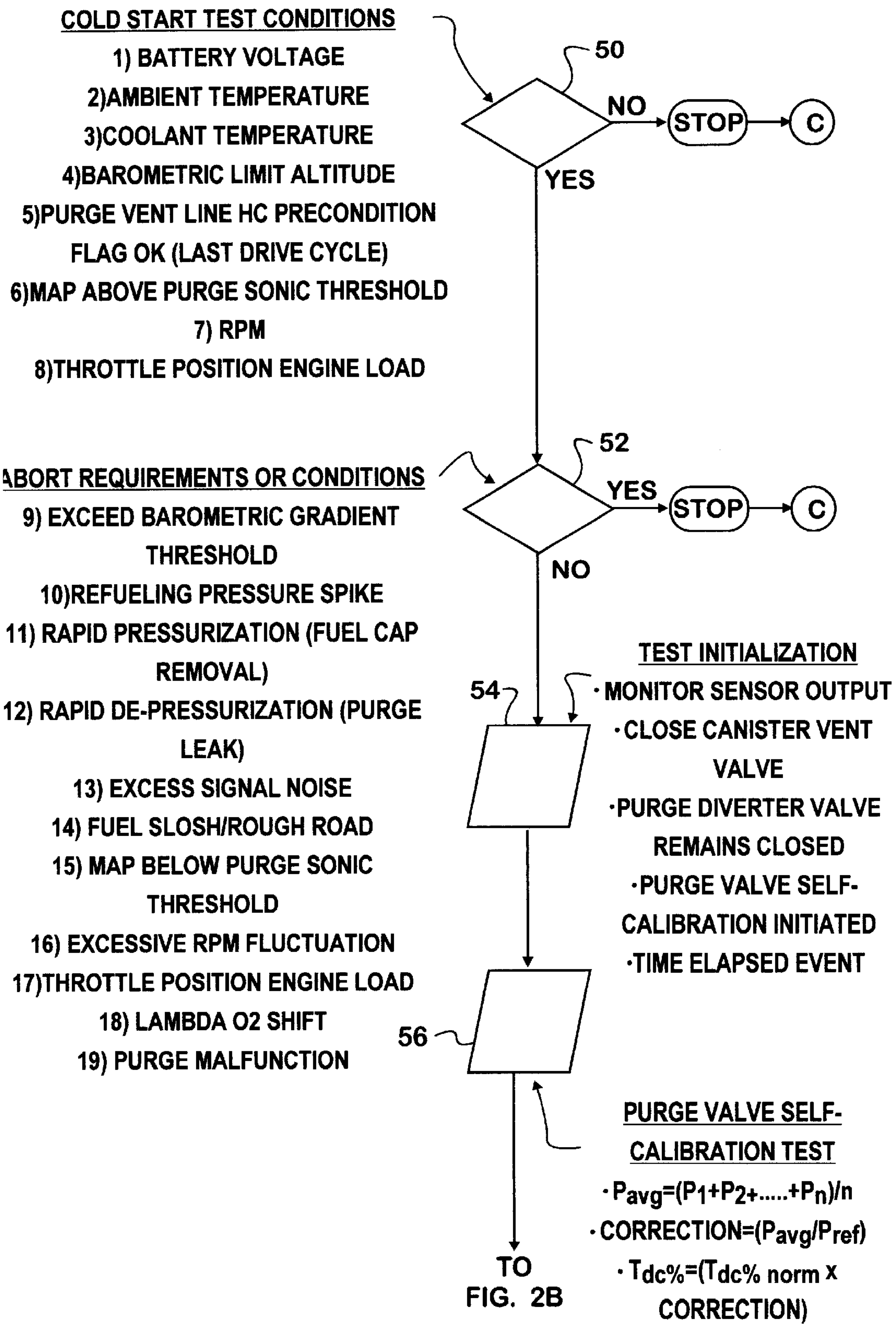
FIGS. 2A and 2B are detailed flow diagram of an exemplary first phase of a leak verification test.
Figure 2B:
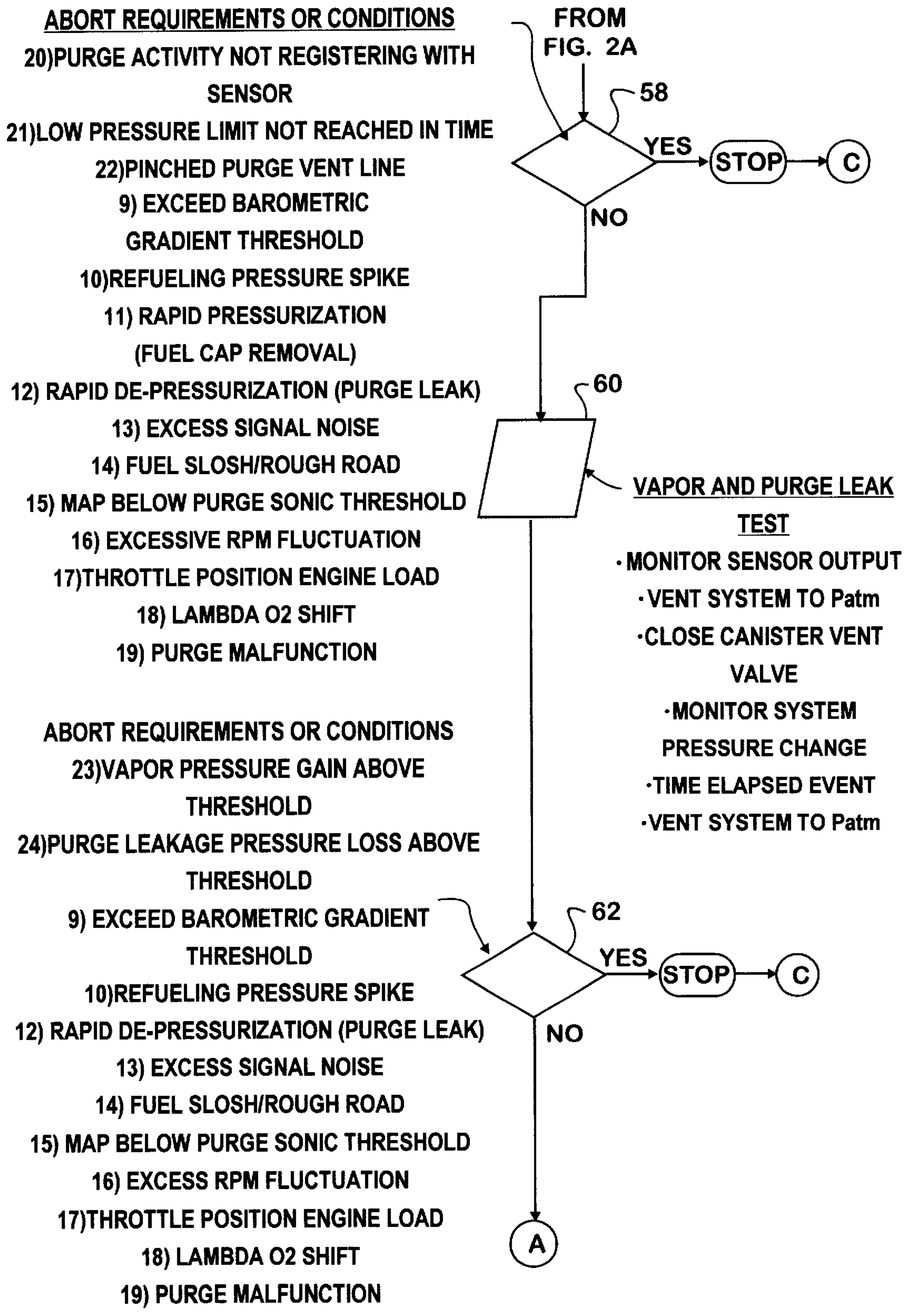

FIGS. 2A and 2B disclose an Algorithm Condition Check Phase. A beginning step 50 of this phase checks for certain cold start test conditions. The following parameters are checked: 1) voltage of the vehicle electrical system battery; 2) ambient outside temperature; 3) engine coolant temperature; 4) barometric pressure; 5) preconditioning of the flow path as described above; 6) manifold absolute pressure; 7) engine speed; and 8) engine load. Data for these parameters may be obtained from any appropriate available source, such as a data bus of the vehicle on which various data is published, or directly from a sensor. Data for some parameters may be inferred from others, such as in the case of engine load, which may be approximated by the position of a sensor that signals the extent to which an accelerator pedal of the vehicle is being depressed. If Step 50 determines that data for the checked parameters does not comply with established values for allowing this phase to proceed, the phase is not allowed to continue. Instead, EMC 26 proceeds to a Diagnostic Algorithm Sleep Mode Phase that will be disclosed in connection with subsequent description of FIG. 5.

On the other hand if step 50 determines that data for the checked parameters does comply with the established values, then the check phase continues by performing a step 52 which checks for compliance of certain conditions any of which would call for an abort if non-compliant. These conditions include: 9) a barometric pressure gradient that exceeds a certain threshold; 10) a pressure spike in the evaporative emission space caused by refueling of the vehicle fuel tank; 11) a sudden change in pressure change in the evaporative emission space indicative of an event such as opening or removing a fuel cap from the end of a fill neck leading to the fuel tank; 12) depressurization of, meaning a rise in vacuum in, the evaporative emission space indicative of an event like a leak through the purge valve; 13) excessive noise in electrical signals relevant to data measurement; 14) excessive fuel slosh in the tank due an event such as driving the vehicle over a rough road; 15) manifold absolute pressure that is below a certain threshold; 16) excessive fluctuation in engine speed; 17) an engine load that is too large; 18) certain change in the richness/leanness of the fuel mixture being combusted in the engine, which may be indicated by a Lambda sensor (i.e. oxygen sensor) disposed to monitor the engine exhaust gas in an engine exhaust manifold; and 19) a malfunction in the purge system. If any of these conditions indicates that the test should not proceed, then EMC 26 proceeds to the Diagnostic Algorithm Sleep Mode Phase.

If the conditions checked by step 52 do not call for an abort, the algorithm next performs a test initialization step 54. Test initialization comprises closing vent valve 36 to terminate venting of the evaporative emission space to atmosphere and opening purge valve 30 so that the engine intake system can draw vacuum in the evaporative emission space from the dirty air side of the canister through a flow path comprising diverter valve 38 and purge valve 30. Hence, vent valve 36 closes, purge valve 30 opens, and pressure sensor 34 monitors pressure (vacuum in this instance) in the closed space.

After test initialization step 54, a purge valve self-calibration test 56 is performed. The self-calibration test comprises operating purge valve 30 using a known signal to assure that vacuum actually created in the evaporative emission space correlates with that signal in a pre-established manner. If there is a discrepancy, then self-calibration is performed by an appropriate adjustment of the signal to achieve the correct pre-established correlation.

At the conclusion of self-calibration test 56, the conditions that were examined by step 52 are reexamined by a step 58, along with certain determinations made as a consequence of steps 54 and 56. A determination that pressure data from sensor 34 was inconsistent with change in vacuum in the evaporative emission space as purge valve 30 was being operated, shown as item 20) in FIG. 2B, would cause an abort. A determination that the engine was unable to draw at least a certain minimum level of vacuum in the evaporative emission space within a predetermined allowable time, shown as item 21) in FIG. 2B, would call for an abort. A determination of a pinched purge vent line, shown as item 22) in FIG. 2B, would also call for an abort. Any call for an abort by step 58 results in EMC 26 proceeding to the Diagnostic Algorithm Sleep Mode Phase. If no abort is called for, a vapor and purge leak test 60 is conducted.

Test 60 is not intended to determine the size of a leak, if any, but rather to confirm that various valves are operating properly and there are no extreme conditions present that would prevent a valid leak size determination from being subsequently made. It comprises venting the evaporative emission space to atmosphere by opening vent valve 36 and thereafter re-closing the vent valve. Purge valve 30 is kept closed while the engine is running, and pressure data from sensor 34 is monitored as test 60 proceeds. Pressure in the closed space should remain within certain limits if the system is suitable for allowing a valid leak size determination to be made. One condition that could prevent this is a leak through the closed purge valve. Such a leak would tend to create vacuum in the closed space. Such vacuum would be measured by sensor 34. Another condition could prevent a valid leak size determination is the rate of fuel vaporization in the tank. Too great a rate would prevent a valid determination of leak size from being subsequently made. The pressure increase resulting from such a rate of vaporization would also be measured by sensor 34.

After step 60, the conditions that were examined by step 52, with the exception of condition 11), are again reexamined by a step 62, along with certain determinations made as a consequence of step 60. If step 60 determined that the rise in vapor pressure exceeded a certain threshold indicative of too great a rate of fuel evaporation, shown as item 23) in FIG. 2B, an abort would occur. If step 60 determined that a loss of pressure exceeding a certain threshold occurred (loss of pressure meaning an increase in vacuum), an abort would also result. Such aborts, like the others, result in EMC 26 proceeding to the Diagnostic Algorithm Sleep Mode Phase.

Figure 3:
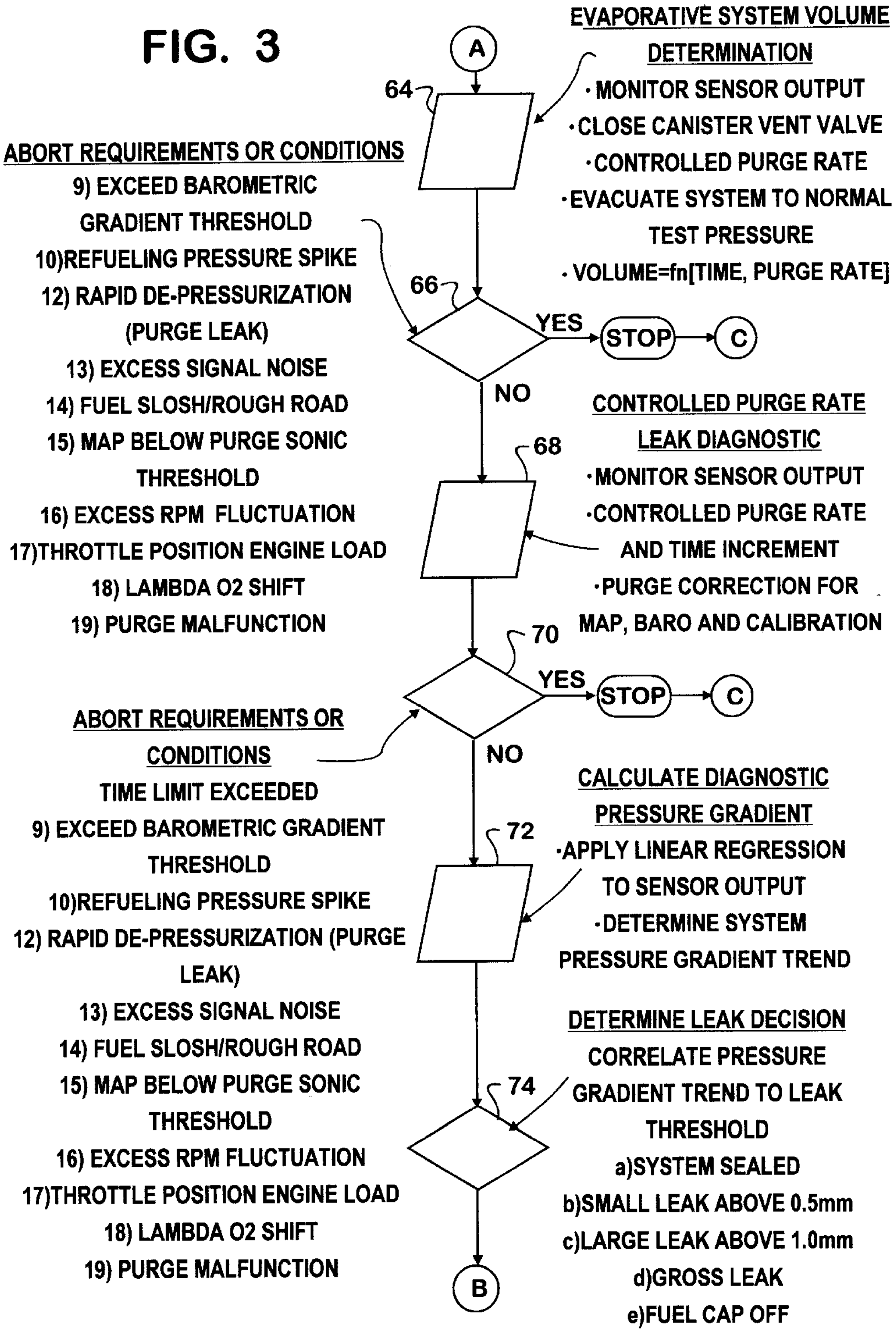
FIG. 3 is detailed flow diagram of an exemplary second phase of the leak verification test.

If step 62 concludes without any abort, then EMC 26 proceeds to execute a Diagnostic Algorithm Test Phase shown in FIG. 3. The first step 64 of that phase comprises determining the volume of the evaporative emission space. For determining that volume, vent valve 36 is closed and purge valve 30 is opened to allow the engine to draw vacuum in the evaporative emission space. Vacuum is drawn until pressure sensor 34 signals that a nominal test vacuum has been reached. The time required to reach that nominal test vacuum is also measured. The volume is a function of that time measurement and the magnitude of intake system vacuum. A suitable algorithm implements that function for allowing the volume determination to be made.

Upon completion of step 64, the conditions that were checked in step 52, with the exception of item 11) are rechecked by a step 66. If those conditions continue to be satisfactory, a step 68 is performed. Any condition calling for an abort results in EMC 26 reverting to the Diagnostic Algorithm Sleep Mode Phase.

Figure 7:
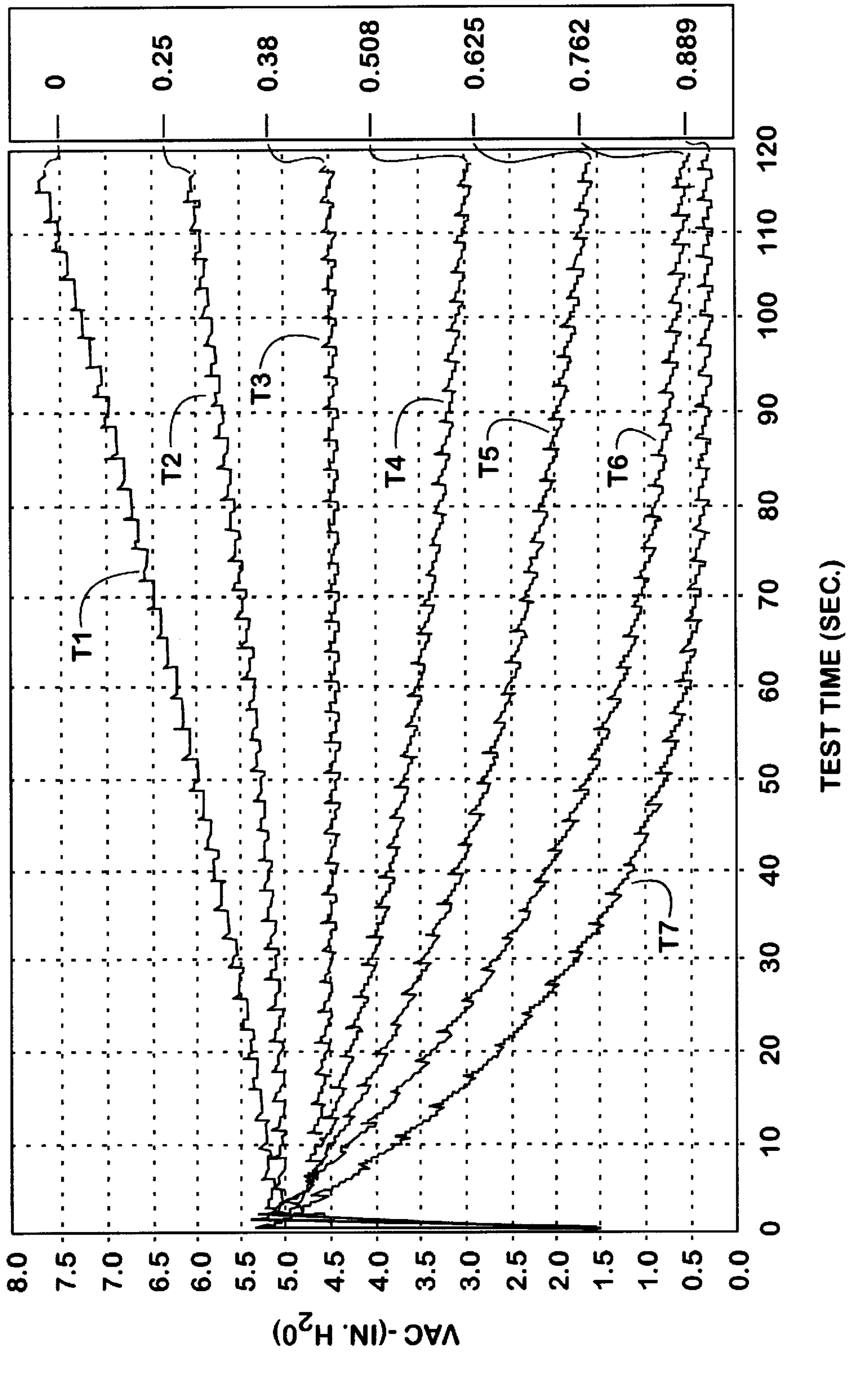
FIG. 7 is a graph plot showing various pressure traces as functions of time in explanation of one of the test phases.

Step 68 comprises a controlled purge rate leak diagnostic, including corrections for changes in manifold absolute pressure, barometric pressure, and calibration. An example of this diagnostic comprises repeatedly opening and closing purge valve 30 in a manner that will cause the pressure in the evaporative emission space to change as a function of time in ways correlated with effective size of any leak that may be present. FIG. 7 shows a graphic example of this. In the example, the normally closed purge valve 30 is repeatedly opened by a 20 millisecond pulse at a 0.3 hertz frequency. FIG. 7 shows several traces T1, T2, T3, etc. of pressure in the evaporative emission space measured by pressure sensor 34 as a function of time. Each of these traces correlates with a particular effective leak size measured as the diameter of an equivalent circular orifice.

After step 68, a step 70 performs the same checks as step 66 with the additional step of checking the time that was required to perform step 68. If that time exceeds an established limit or if any of the other conditions that would call for aborting the test are present, then an abort occurs, and EMC 26 reverts to the Diagnostic Algorithm Sleep Mode Phase. If no abort is called for, a step 72 is executed.

Step 72 is one that calculates a diagnostic pressure gradient by applying linear regression analysis to the signal obtained from pressure sensor 34 during step 68 to determine a system pressure gradient trend. In this regard it should be noted that an actual pressure signal from sensor 34 may not exactly correlate with a specific trace like those shown in FIG. 7 because each of those traces presumes a steady state condition. The system pressure gradient trend is then correlated with a leak detection threshold by a subsequent step 72 to make one of the following five determinations: Determination 1) that the system is sealed completely free of any measurable leakage; Determination 2) that a small leak greater than a certain minimum but less than a certain maximum is present; Determination 3) that a large leak greater than the certain maximum, but one that is smaller than a gross leak is present; Determination 4) that a gross leak, but not one as large as that which would exist if the fuel filler cap were off, is present; and Determination 5) that a leak indicating that the fuel filler cap is off is present.

Figure 4:
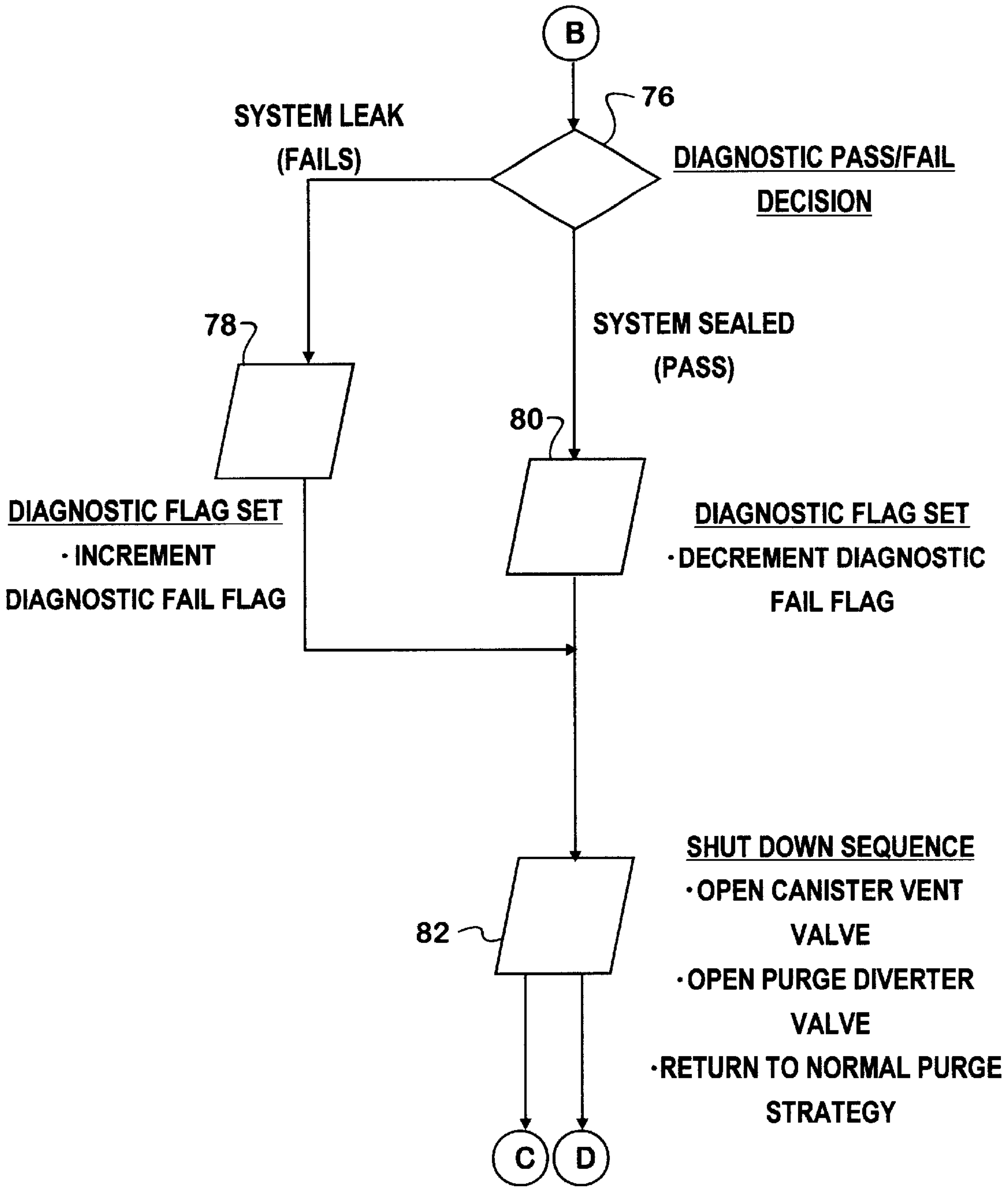
FIG. 4 is detailed flow diagram of an exemplary third phase of the leak verification test.

It may happen that step 74 is unable to make a correlation that results in a leak decision determination. In that case the algorithm executes a loop, returning to step 68 and then continuing through steps 70 and 72 to step 74. The algorithm will continue to loop until a determination is made at which time EMC 26 proceeds to execute a Diagnostic Algorithm Shut Down Phase that is shown in FIG. 4.

One way of characterizing the determination resulting from step 74 is by either a pass decision or a fail decision. Hence, the possible determinations from step 74 are categorized so that each falls into either a pass category or a fail category. Step 76 of the Diagnostic Algorithm Shut Down Phase makes the categorization by either incrementing or decrementing a diagnostic flag to register either a fail decision (step 78) or a pass decision (step 80).

Thereafter a shut down sequence step 82 opens vent valve 36 and deactivates diverter valve 38 to return the system to a state that allows scheduled purging of fuel vapor from the evaporative emission space by operating purge valve 30 according to the purge strategy that the vehicle manufacture has specified for the particular vehicle and engine.

Figure 5:
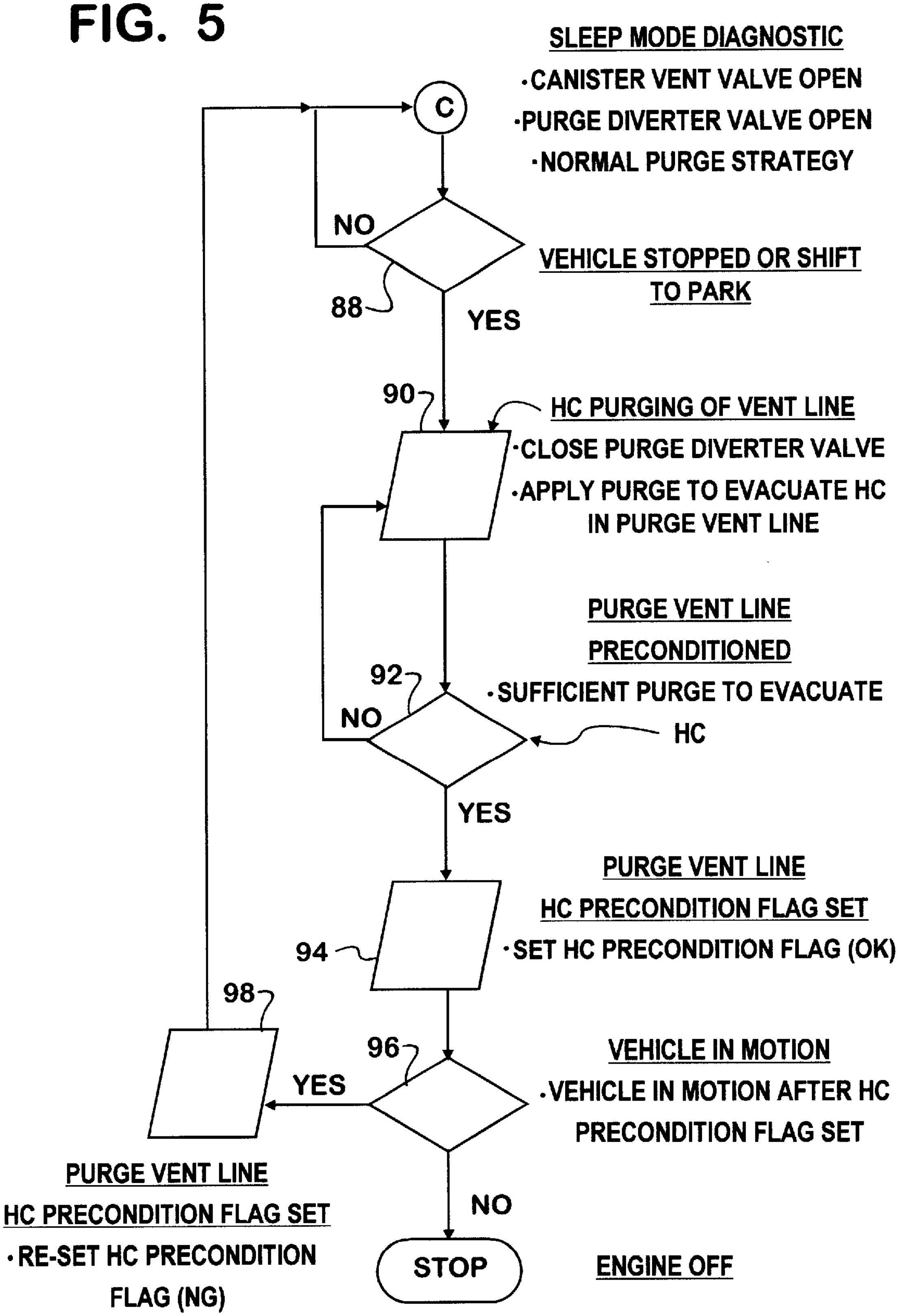
FIG. 5 is detailed flow diagram of an exemplary fourth phase of the leak verification test.
Figure 6:
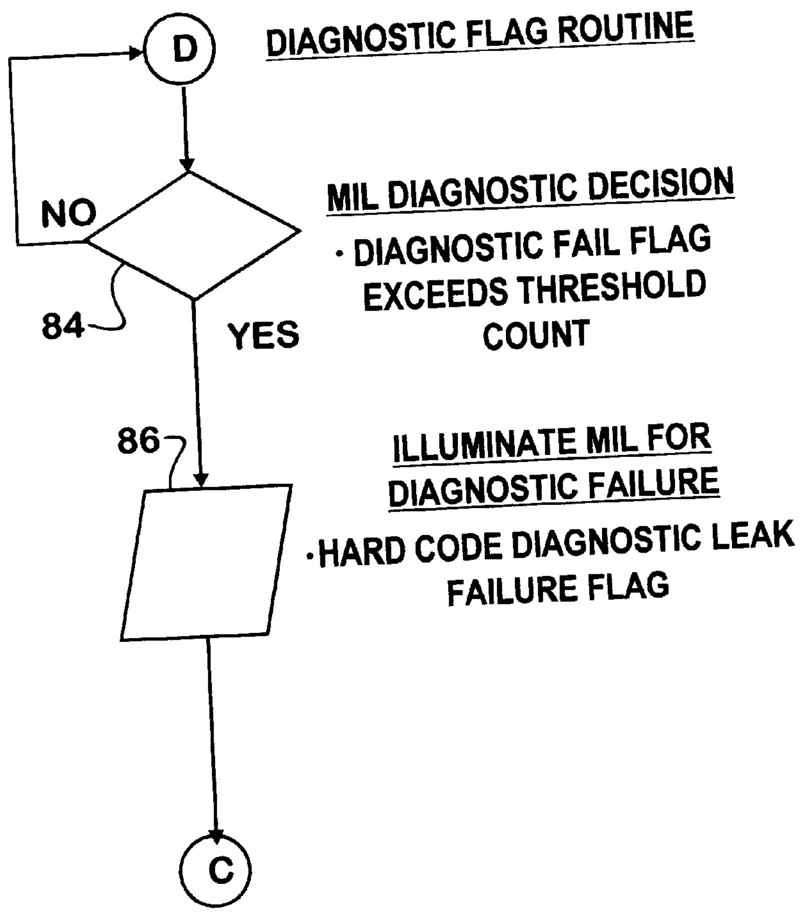
FIG. 6 is detailed flow diagram of an exemplary fifth phase of the leak verification test.

Once shut down sequence step 82 has concluded, EMC 26 proceeds to enter the Sleep Mode phase of FIG. 5 and to announce the pass/fail decision to a Diagnostic MIL Illumination Phase shown in FIG. 6. Because a single fail decision may not necessarily indicate a true leak, the phase of FIG. 6 accumulates a count of fail decisions occurring over a number of leak verification tests. Only after a certain number of fail decisions have been accumulated (step 84) is a signal given to announce a failure such as by illuminating a light on the instrument panel of the vehicle (step 86).

The Sleep Mode Phase commences with actuator 36S having been deactivated to open vent valve 36 and with actuator 38S of diverter valve 38 also deactivated. Purging of vapor from the evaporative emission space is allowed to proceed as determined by the purge strategy for the particular vehicle and engine. Whenever an indication is given that the driver intends to stop the vehicle and shut down the engine, such as by a signal that the vehicle is not in motion or that its transmission has been placed in a non-drive gear such as park (step 88), such an event initiates a preconditioning of the purge flow path through purge valve 30 to the engine intake system (step 90). Preconditioning occurs in the manner described earlier.

Because preconditioning relies on the availability of suitable engine vacuum, there must be assurance that the engine has continued running for a sufficient time subsequent to whatever event signaled an intent to stop the vehicle and shut down the engine. This assurance is ascertained by a step 92. A successful preconditioning of the purge flow path is indicated by a step 94 setting a precondition flag.

Resumption of vehicle motion without shutting down the engine after the purge flow path has been preconditioned will disqualify that preconditioning. Therefore a step 96 monitors for resumption of vehicle motion. If motion does not resume and the engine is shut down, the Sleep Mode Phase concludes. On the other hand, if step 96 signals resumption of vehicle motion, a step 98 resets the precondition flag, and the algorithm loops by returning to step 88 to execute succeeding steps whenever an intention to stop the vehicle and shut down the engine is signaled.

Because the preconditioned state is maintained while the engine is off until such time after engine restarting as diverter valve 38 is operated to open the evaporative emission space to purge valve 30 by opening port 38B to port 38C, the integrity of the preconditioning is assured. If an engine has been shut off for an amount of time that has allowed the lambda sensor to cool to a point where it must be re-heated before it is allowed to exercise closed-loop control of the air-fuel ratio via the engine electronic control, the engine must run for an amount of time sufficient to re-heats the lambda sensor to a point where closed-loop control can once again begin. Purging of the canister is generally considered inappropriate in the absence of closed-loop control by the lambda sensor because of potential adverse impact on tailpipe emissions. However, by operating the various valves to draw vacuum in the evaporative emission space from the clean air side of the canister, no fuel vapor from the evaporative emission space will be drawn into the engine intake system. By drawing vacuum for a leak verification test in this way, the invention enables the test to commence immediately after a cold engine has been started and before the lambda sensor has been re-heated sufficiently to allow it to re-acquire closed-loop control of the air-fuel ratio. The lambda sensor senses richness/leanness of the air/fuel mixture being combusted in the engine, but only when sufficiently heated.

A condition where hydrocarbons could be drawn from the clean air port of the canister into the engine intake system before the lambda sensor has acquired closed-loop control may be deemed undesirable. Oversaturation of the canister medium would be an example of such a condition. However, once the lambda sensor has been sufficiently reheated, it becomes capable of detecting such an emission of hydrocarbons. Hence, by drawing from the clean air port of the canister after the lambda sensor has re-acquired closed-loop control, emission of hydrocarbons from the canister may become manifest by a distinctive signature in the output of the lambda sensor. The additional hydrocarbon contribution from the purge vapor to the air-fuel mixture will alter the desired air-fuel ratio commanded by the closed-loop control in a way sufficiently different from the way the ratio would change if only air were being drawn through the purge flow path that the change can be read in the lambda sensor signal.

Figure 8:
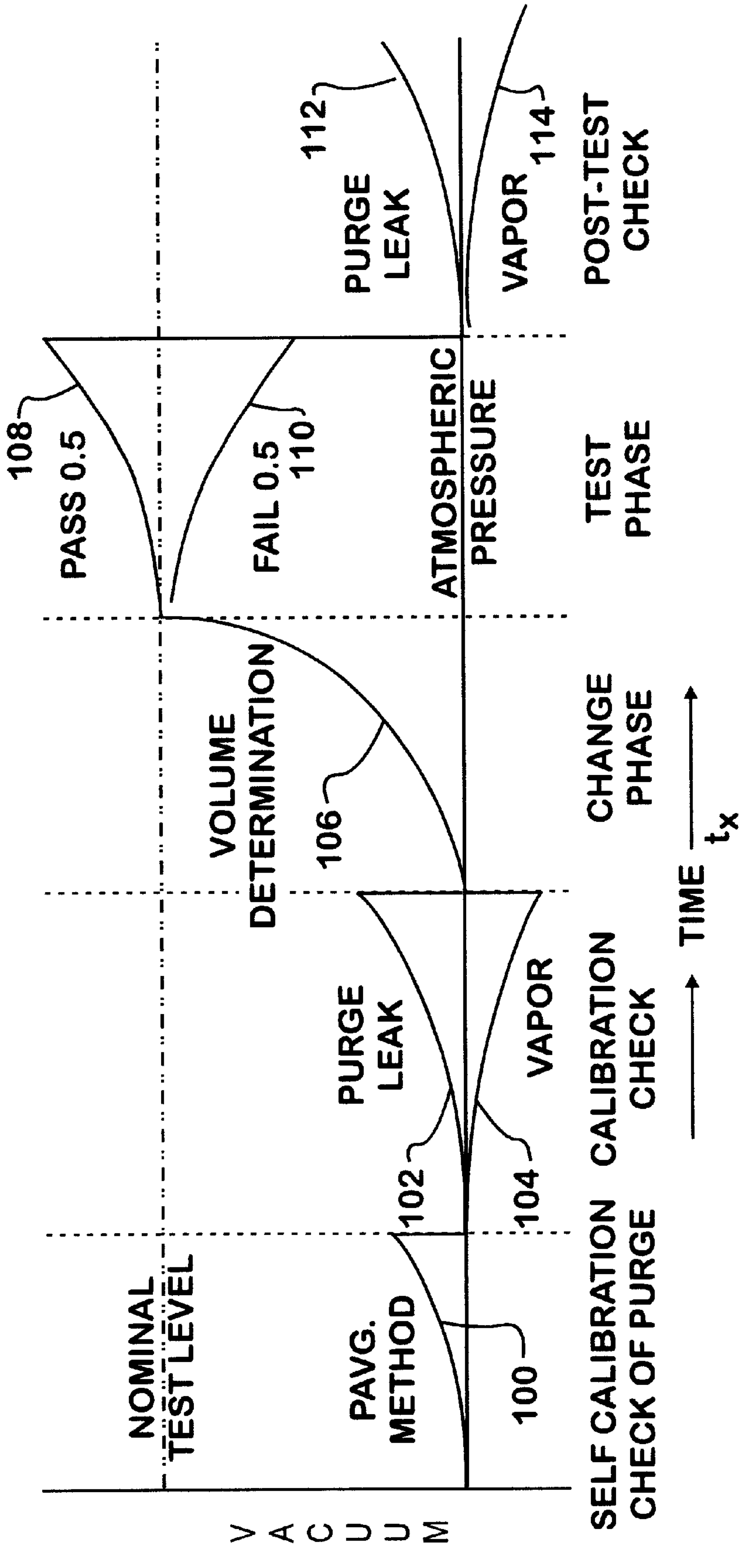
FIG. 8 is a generalized graph plot of pressure versus time consolidating the phases of FIGS. 2A–6 to show representative outcomes.

FIG. 8 is a generalized graph plot of pressure versus time that consolidates the phases of FIGS. 2A–6 to show representative outcomes. The pressures traces represent pressures sensed by sensor 34. A pressure trace 100 is illustrative of how vacuum may increase during the self-calibration step 56. Traces 102, 104 depict respective possible outcomes of the vapor and purge leak test step 60. Trace 102 is representative of a condition where there is an apparent leak through the closed purge valve. Trace 104 indicates excessive fuel vapor generation in the tank headspace. A trace 106 illustrates a representative volume determination by step 64. Traces 108, 110 depict representative outcomes indicating pass and fail respectively resulting from steps 74, 76. Traces 112, 114 are respective post-test traces that duplicate the step that produced traces 102 and 104. The post-test check serves to confirm that a change in conditions that could affect the validity of a completed test did not occur during the test.

Figures 9, 10:
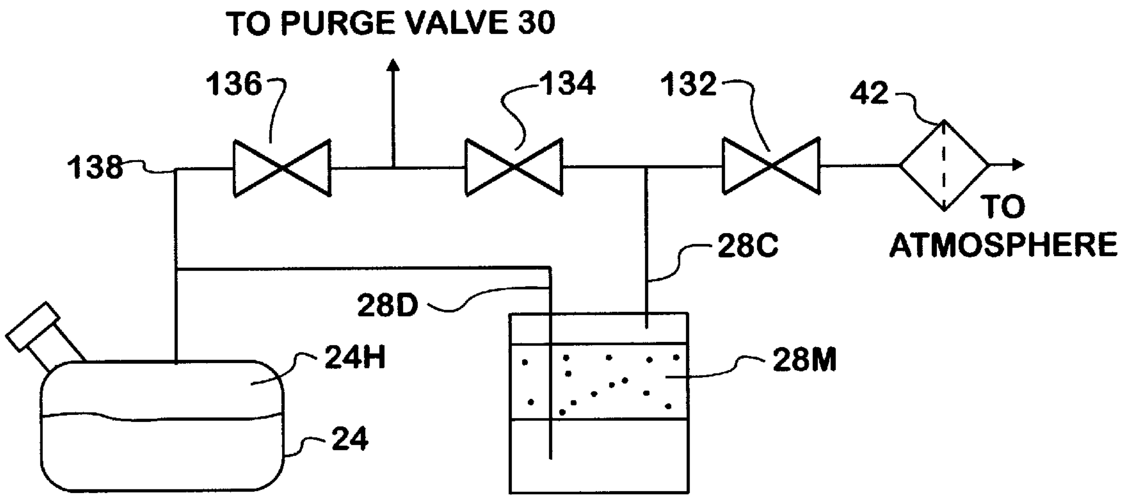
FIG. 9 is schematic diagram of an automotive vehicle evaporative emission control system including a second exemplary embodiment of vacuum leak verification system embodying principles of the invention.
FIG. 10 is a table defining various operating states for the embodiment of FIG. 9.

FIG. 9 illustrates schematically a second embodiment in which the functions that have been ascribed earlier to pressure sensor 34, vent valve 36, and diverter valve 38 are embodied in a single assembly 130 shown in association with canister 28, fuel tank 24, and filter 42. This embodiment does not incorporate the redundant check valve 40. Assembly 130 comprises a vent valve 132, a first two-way valve 134, and a second two-way valve 136 arranged in series in a flow path 138 that extends from filter 42 to the dirty air side of canister 28 and tank headspace 24H. Inlet 30A of purge valve 30 is communicated to flow path 138 by a tee 140 between of valves 134 and 136. Clean air port 28C of canister 28 is communicated to flow path 138 by a tee 142 between valve 134 and vent valve 132. FIG. 10 shows three different operating states for assembly 130.

When purge flow path preconditioning is being performed, assembly 130 assumes the first of the three operating states, and that is the state shown by FIGS. 11 and 12. Vent valve 132 and valve 134 are open while valve 136 is closed. When purge valve 30 is opened, intake system vacuum draws fresh air through valves 132 and 134, purging the flow path between canister clean air port 28C and the intake system of any residual hydrocarbons from previous evaporative emission space purging.

When leak verification testing is being performed, assembly 130 assumes the second operating state. Vent valve 132 and valve 136 are both closed while valve 134 is open. When purge valve 30 is opened, the intake system begins drawing vacuum in the evaporative emission space via clean air port 28C.

When neither preconditioning of the purge flow path nor leak verification testing is being performed, assembly 130 assumes the third operating state. Vent valve 132 is open, valve 134 is closed, and valve 136 is open. The evaporative emission space is vented to atmosphere through filter 42, and when purge valve 30 opens, intake system vacuum from the running engine is communicated through valve 136 to the evaporative emission space, purging it of fuel vapor.

FIGS. 11 and 12 show representative constructional detail of assembly 130, comprising a housing 148 containing a solenoid actuator 150 operating valves 132, 134, and 136 to the respective operating states. Housing 148 comprises four ports 152, 154, 156, and 158. A conduit places port 152, dirty air port 28D of canister 28, and tank headspace 24H in common communication. Port 154 communicates via another conduit with inlet port 30A of purge valve 30. Port 156 communicates vent valve 132 with filter 42 via still another conduit, and port 158 communicates through yet another conduit with canister clean air port 28C. The first operating state shown by FIGS. 11 and 12 occurs when solenoid actuator 150 is not being energized by electric current; the second state, when the actuator is being partially energized, and the third, when the actuator is being fully energized.

The internal mechanism of assembly 130 comprises an armature 160 that is positionable lengthwise along an imaginary longitudinal centerline 162 of actuator 150. A solenoid coil 163, which cooperates with armature 160 to form the actuator solenoid, is disposed concentric with centerline 162. Partial energization of actuator 150 is effective to displace armature 160 to the left from the position shown in FIGS. 11 and 12 to an intermediate position closing vent valve 132 while leaving valve 134 open and valve 136 closed. Full energization of actuator 150 displaces armature 160 even further to the left to a position where vent valve 132 reopens, valve 134 closes, and valve 136 opens.

A stator 164 cooperates with armature 160 to form the magnetic circuit of the solenoid. An air gap 166 is present in the magnetic circuit, and as electric current in coil 163 increases, so does the magnetic flux at air gap 166. This exerts increasing force urging armature 160 toward the left in FIGS. 11 and 12. The force is resisted however by a helical coil spring 168. At partial energization, the armature position stabilizes in the intermediate position of the second operating state as described above, with spring 168 partially compressed. At full energization, the armature position stabilizes in the fully displaced position of the third operating state, and spring 168 is maximally compressed.

Armature 160 carries a plunger 170 that is received, and guided by a sleeve 171 for lengthwise displacement, within a blind hole 172 concentric with centerline 162 at one end of the armature. Plunger 170 is biased outward of hole 172 by a spring 174 disposed at the innermost end of the hole. A ring 175 on the plunger provides a stop that abuts sleeve 171 to prevents the plunger from coming out of the hole.

Valve 136 comprises a valve element 176 that is biased by a spring 178 to close on a valve seat 180 that circumscribes an opening 182 through a transverse wall 183 of housing 148 coaxial with centerline 162. Valve seat 180 is disposed at one end of a short passage 184 that is also concentric with centerline 162. The opposite end of passage 184 is open to an interior space 186. With valve element 176 seated on seat 180, it closes passage 184 to port 152, and when the valve element is unseated in a manner to be described, it opens passage 184 to port 152. Port 154 is at all times open to interior space 168.

Plunger 170 further comprises a stem 190 that points toward the center of valve element 176. When actuator 150 is fully energized, the tip of stem 190 engages valve element 176 to unseat it from spring 180 against the resistance of spring 178, thereby opening valve 136 by establishing communication of port 152 to interior space 186. When actuator 150 is only partially energized, or not energized at all, the position of armature 160 and the relative forces of springs 168 and 174 cause plunger 170 to assume a position where the tip of stem 190 is out of contact with valve element 176, thereby allowing spring 178 to close the valve element on seat 180. By suitable sizing of parts, a certain amount of lost motion between plunger 170 and armature 160 is allowed as the actuator operates between fully and partially energized positions. When fully energized, the armature will be displaced sufficiently to assure that valve 136 closes, although plunger 170 may retract to some extent within hole 172 as it unseats valve element 176.

Valve 134 is defined in part by an opening 192 through another transverse wall 193 of housing 148 opposite valve 136 relative to the solenoid. Vent valve 132 is defined in part by an opening 194 through yet another transverse wall 195 beyond wall 193. A stem 196 protrudes along centerline 162 from the end of armature 160 opposite hole 172. Two spaced apart valve elements 198, 200 are centrally affixed to stem 196 in a fluid-tight manner. Valve element 198 cooperates with opening 192 to define valve 134, and valve element 200 cooperates with opening 194 to define vent valve 132.

In the first operating state, both valves 132 and 134 are open because the armature positions the respective valve elements 198 and 200 away from the respective walls 193 and 195. Stem 190 is spaced from valve element 176 so that valve 136 is closed.

In the second operating state, valve 132 closes while valve 134 stays open. The partial energization that causes the mechanism to assume the second operating state displaces armature 160 to the left from the positions shown in FIGS. 11 and 12 such that a circular seal 202 disposed on the perimeter of valve element 200 seals against a flat surface 203 of wall 195 to close opening 194. A circular seal 204 on the perimeter of valve element 198, although now closer to wall 193, remains spaced from that wall, keeping opening 192 open. Valve 136 also remains closed.

In the third operating state, valve 132 reopens while valve 134 closes. With full energization of the solenoid actuator, armature 160 is maximally displaced, causing seal 204 to seal against wall 193 thereby closing opening 192. As the armature is being displaced, stem 196 is pulling the center of valve element 200 through opening 194 while the margin of the valve element inside of seal 202 is being forced against the free end of a curled lip 207 of wall 195 that circumscribes opening 194. Element 200 is fabricated as a thin spring steel disk so that as its center is being increasingly pulled through opening 194, the action of lip 207 causes the nominally flat disk to flex to a concave-convex shape. This shape change causes seal 202 to swing away from sealing contact with flat surface 203 creating an annular gap between itself and wall 195. Lip 207 contains a series of spaced apart notches 209 spaced circumferentially apart around the lip. Air from filter 42 can now pass around the edge of the valve element and through notches 209 to an internal space 210 that lies between the two valves 132 and 134. Port 158 is open to this space 210. Pressure sensor 34 senses pressure in space 210.

Space 210 also has communication with space 186 at the opposite end of the solenoid when valve 134 is open. Such communication can be established by construction details of the solenoid and the housing. One such construction comprises longitudinal channels that are molded into the side wall of the housing surrounding the solenoid coil. Another comprises constructing the armature and the through-hole in the bobbin on which the coil is wound to have different transverse cross sections that define channels running between opposite ends of the solenoid. Hence, the construction of assembly 130 comports with the schematic of FIG. 9 and its operation with the three operating states of FIG. 10.

Assembly 130 possesses several significant advantages. A single solenoid can operate the assembly mechanism to the three different operating states. Hence multiple actuators, as in the FIG. 1 embodiment, may be unnecessary. Because the preconditioning path by-passes the evaporative emission space during preconditioning, pressure sensor 34 can also be used during that time to check the pressure drop across filter 42. A significant pressure drop could indicate a clogged filter that requires service. Pressure sensors that are mounted to sense pressure directly in the fuel tank headspace lack this capability.

The ability of the inventive leak verification system to accurately measure effective leak size is premised on the ability of whatever purge valve is used to repeatedly flow a known volume each time it is pulsed by a pulse during the controlled purge rate leak diagnostic step 68. Some purge valves may exhibit a sonic flow characteristic. Others may exhibit a choked flow characteristic that is not necessarily sonic. Accordingly, calibration mapping of certain valves and/or MAP compensation may be necessary to assure that the valve is operated with a signal that produces the desired flow through the valve when pulsed open.

Principles of the invention may be practiced without necessarily using the specific steps of FIGS. 2A through 6. For example, volume determination step 64 may be unnecessary for certain types of testing, such as possibly when a test simply determines whether the presence or absence of leak exceeding a certain effective size. Where a test determines a measurement of the effective leak size, the volume determination step may be used to assure best accuracy. Likewise, there are equivalent alternatives to the step of pulsing the purge valve in a manner that creates traces like those of FIG. 7. For example, the purge valve may be pulsed in a way that strives to maintain nominal test pressure in the presence of a leak. In order to do this, the pulses must be adjusted in an appropriate manner. The amount of pulse adjustment is then used as an indication of effective leak size.

While a presently preferred embodiment of the invention has been illustrated and described, it should be appreciated that principles are applicable to other embodiments that fall within the scope of the following claims. For example, assembly 130 could be integrated with other components of the overall system instead of being a separate assembly. It is also contemplated that the need for some overtravel that is provided by spring-biasing of plunger 170 in through-hole 172 can be unnecessary in some designs, allowing elimination of spring 174 and enabling the functions of armature 160 and plunger 170 to be combined in a single part.

What is claimed is:

1. An automotive vehicle that is powered by an internal combustion engine and comprises:

a tank for storing volatile fuel that is consumed by the engine;

a vapor storage canister that comprises a dirty air port in communication with headspace of the tank to cooperatively define an evaporative emission space for containing vapor generated by the evaporation of liquid fuel in the tank and that comprises a vapor absorbent medium separating the dirty air port from a clean air port; and a system for performing a leak verification test to test the evaporative emission space for leakage comprising self-calibrating the purge valve, closing the evaporative emission space to atmosphere and an intake system of the engine and monitoring for conditions calling for aborting the test, performing a leak determination test, and entering a sleep mode while the engine continues to run.

2. An automotive vehicle as set forth in claim 1 in which the system, while in the sleep mode, preconditions a path to the intake system through the purge valve when a signal indicates that the engine is about to be shut off.

3. An automotive vehicle as set forth in claim 2 in which the system sets a precondition flag when the preconditioning is complete.

4. An automotive vehicle as set forth in claim 3 in which the system resets the precondition flag if a signal is given indicating that the vehicle will continue to be driven.

5. An automotive vehicle as set forth in claim 1 in which the system makes a determination of the volume of the evaporative emission space prior to the leak determination test.

6. In an automotive vehicle that is powered by an internal combustion engine and comprises:

a tank for storing volatile fuel that is consumed by the engine;

a vapor storage canister that comprises a dirty air port in communication with headspace of the tank to cooperatively define an evaporative emission space for containing vapor generated by the evaporation of liquid fuel in the tank and that comprises a vapor absorbent medium separating the dirty air port from a clean air port; and a method for performing a leak verification test to test the evaporative emission space for leakage comprising self-calibrating the purge valve, closing the evaporative emission space to atmosphere and an intake system of the engine and monitoring for conditions calling for aborting the test, performing a leak determination test, and entering a sleep mode while the engine continues to run.

7. A method as set forth in claim 6 in which, while in the sleep mode, preconditioning a path to the intake system through the purge valve when a signal indicates that the engine is about to be shut off.

8. A method as set forth in claim 7 including setting a precondition flag when the preconditioning is complete.

9. A method as set forth in claim 1 including resetting the precondition flag if a signal is given indicating that the vehicle will continue to be driven.

10. A method as set forth in claim 1 including making a determination of the volume of the evaporative emission space prior to the leak determination test.

* * * * *